US012483602B2

(12) United States Patent
O'Byrne et al.

(10) Patent No.: US 12,483,602 B2
(45) Date of Patent: *Nov. 25, 2025

(54) COMPUTER IMPLEMENTED METHOD AND APPARATUS FOR MANAGEMENT OF NON-BINARY PRIVILEGES IN A STRUCTURED USER ENVIRONMENT

(71) Applicant: Kinaxis Inc., Ottawa (CA)

(72) Inventors: Ryan O'Byrne, Ottawa (CA); Allan Yogasingam, Ottawa (CA); Christopher Burt, Ottawa (CA)

(73) Assignee: Kinaxis Inc., Ottawa (CA)

( * ) Notice: Subject to any disclaimer, the term of this patent is extended or adjusted under 35 U.S.C. 154(b) by 88 days.

This patent is subject to a terminal disclaimer.

(21) Appl. No.: 18/301,685

(22) Filed: Apr. 17, 2023

(65) Prior Publication Data

US 2023/0254344 A1   Aug. 10, 2023

Related U.S. Application Data

(63) Continuation of application No. 16/853,805, filed on Apr. 21, 2020, now Pat. No. 11,665,204.

(51) Int. Cl.
*H04L 9/40* (2022.01)
*G06F 3/04847* (2022.01)
(52) U.S. Cl.
CPC ........ *H04L 63/205* (2013.01); *G06F 3/04847* (2013.01)

(58) Field of Classification Search
CPC . H04L 63/205; H04L 63/0263; H04L 63/102; G06F 3/04847
See application file for complete search history.

(56) References Cited

U.S. PATENT DOCUMENTS

| 8,229,977 | B1 | 7/2012 | Anderson et al. |
| 9,628,493 | B2 | 4/2017 | Warshavsky et al. |
| 9,652,255 | B2 | 5/2017 | Schachtel et al. |
| 10,394,412 | B2 | 8/2019 | Torman et al. |
| 10,819,747 | B1* | 10/2020 | Sedky ............ H04L 63/105 |
| 2003/0037263 | A1* | 2/2003 | Kamat ............ G06F 21/6227 726/14 |
| 2006/0095422 | A1 | 5/2006 | Kikuchi |
| 2007/0097655 | A1 | 5/2007 | Yampolsky et al. |
| 2008/0127307 | A1 | 5/2008 | Fukuta |
| 2008/0160956 | A1* | 7/2008 | Jackson ........... H04W 4/029 455/406 |
| 2010/0058434 | A1* | 3/2010 | Chusing ........... G06F 21/604 726/1 |
| 2015/0256526 | A1 | 9/2015 | Biegala et al. |

* cited by examiner

*Primary Examiner* — John T Repsher, III
(74) *Attorney, Agent, or Firm* — Borden Ladner Gervais LLP

(57) ABSTRACT

Methods and systems to manage permissions in a structured user-environment which provide a User Interface (UI) that provides a simple, intuitive administration to apply permissions at the user and group level to data in the structured user-environment. The UI also provides feedback to the administrator as to the inheritance path of each user and/or group as well as links between permissions, allowing the administrator to determine how a user or group was granted or denied access to a permission or resource.

18 Claims, 11 Drawing Sheets

STEP 614

Jane Doe - User Permissions

| | Setting | Effective |
|---|---|---|
| System Tools | | |
| Use web services | Allow ▼ | Allowed ⓘ — Allowed by 👥 Business Users |

}802

STEP 622

Jane Doe - User Permissions

| | Setting | Effective |
|---|---|---|
| System Tools | | |
| Use web services | ▼ | Allowed ⓘ — Allowed by 👥 Business Users |

}802

STEP 706

Jane Doe - User Permissions

| | Setting | Effective |
|---|---|---|
| System Tools | | |
| Use web services | ▼ | Allowed ⓘ — Allowed by 👥 Business Users |

}802

DID AN EFFECTIVE VALUE CHANGE? 708

NO

RETURN TO STEP 614

FIG. 8

COMPUTER IMPLEMENTED METHOD AND APPARATUS FOR MANAGEMENT OF NON-BINARY PRIVILEGES IN A STRUCTURED USER ENVIRONMENT

CROSS-REFERENCE

This application is a continuation of U.S. patent application Ser. No. 16/853,805 filed Apr. 21, 202, the entirety of which is hereby incorporated by reference.

TECHNICAL BACKGROUND

The present disclosure generally relates to the management of group/user permissions. In particular, it relates to systems and methods for the administration of non-binary privileges in a structured user environment.

BACKGROUND

A structured user environment is accessed through user accounts with various capabilities within the system. A user account includes a configuration of permissions, which grant or revoke capabilities as may be appropriate. "Groups" also represent a configuration of permissions. That configuration is inherited by the members of the group, i.e. user accounts and other groups.

A user or group is often a member of multiple groups, which themselves may be members of other groups. Also, in any permission configuration, any permission may be granted, not granted, or explicitly denied. In these cases, multiple permission configurations inherited from the membership structure are resolved according to specific rules. This complexity escalates as new access control capabilities arrive.

Administrators responsible for configuring permissions are presented with both a powerful tool and a potentially complex challenge. Group membership structure serves multiple purposes beyond permissions, such as representing the organization and controlling access to reports within the environment. Understanding why (or why not) a certain capability is permitted, and manipulating that configuration, requires visibility and comprehension of membership status and inheritance mechanics.

For example, a structured user environment can have no limitations on the number of users and groups that can be created by an administrator. Due to the vast amount of permissions that can be applied to each and group, it is difficult for the administrator to see what data (or resources provided by the structured user environment) each user and group has access to. Furthermore, the administrator has little to no visibility into the permissions structure of the structured user environment.

Systems for managing permissions in structured user environments typically follow rudimentary graphical user interface (GUI) conventions when displaying status and offering control. Tables of attributes may be used to enumerate the properties of "authorization objects". Arrays of checkbox controls may feature intermediary states to encode information beyond the effective setting of a permission, such as inheritance from elsewhere in a group structure. Typically, multiple objects or views must be consulted to obtain a complete picture of a given configuration in order to diagnose issues. This requires time since a manual approach must be taken to review multiple objects in order to obtain a complete picture of a given configuration, which is only the starting point of the diagnosis. Such an approach is highly inefficient, time-consuming and laborious.

BRIEF SUMMARY

Disclosed herein are methods and systems to manage permissions in a structured user-environment that address the problems discussed above.

In some embodiments of the methods and systems, there is provided a User Interface (UI) that provides a simple, intuitive administration to apply permissions at the user and group level to data in the structured user-environment. The UI also provides feedback to the administrator as to the inheritance path of each user and/or group, allowing the administrator to determine how a user or group was granted or denied access to a permission or resource (that is— whether it was granted directly to the user or group or via inheritance by being a member of another group). This saves the administrator time and resources.

In some embodiments, such methods and systems comprise user accounts that allow users to use the structured user-environment; permissions that determine what each user account can see and do; groups that can define permissions for their respective members; rules for resolving permissions "inherited" from multiple groups; a menu-based UI with complex values such as granting, denying, and 'neutral' (subject to inheritance, rather than overriding inherited values); an effective value of a permission after resolving inheritance; and an information link (hereafter referred to as an "Infotip") UI that explains the effective value of a permission. In some embodiments, the "Infotip" can explain inheritance from groups, either granting on denying a permission; dependence on other permissions; and dependence on a software license to be enabled.

In some embodiments, administrators plan several groups to grant different permissions. For example, there may be "workers" "managers" and "administrators". A number of more specialized groups may be needed. Groups may be members of other groups, thereby creating one or more chains of inheritance. A group structure can implement permissions, but can also represent simultaneously the organization and control access to reports and other content.

In some embodiments, permission values can be resolved from multiple factors, including local controls, and the effective values are displayed. Furthermore, "Infotips" can be invoked by an administrator to explain the resolution. This enables administrators to verify the implementation of permissions and also diagnose issues. Permission values and "Infotips" may be updated in real-time, speeding up the interaction and indicating dependencies directly.

The methods and systems to manage permissions in a structured user-environment disclosed herein can be applied to, for example, a system that has a software environment accessed through user accounts, permissions (values that control whether an account is able to use various capabilities in the system), and administrators (people responsible for controlling accounts and their permissions). Examples include computer operating systems; cloud-based software services and databases.

In an aspect, a computer-implemented method is provided for managing a set of permissions on a user interface, the method comprising: retrieving, by a client, from a server, a setting value and an inherited value for each permission in the set of permissions; generating, by the client, an effective value for each permission from the setting value and the inherited value; initializing, by the client, a setting control and an effective control for each permission, with data from the server; offering, by the client, an information link for each effective value that has a conflict with a corresponding setting value; determining, by the client, an editability of one or more setting values with the data from the server; displaying, by the client, the user interface on a device to an administrator; changing, by the administrator, a selected setting value via the user interface; updating, by the client: one or more effective values changed by changing the selected setting value; one or more information links changed by changing the selected setting value; one or more editabilities changed by changing the selected setting value; and one or more setting values changed by changing the selected setting value; and transmitting, by the client, to the server, one or more updated setting values and one or more updated effective values.

In some embodiments of the computer-implemented method, when initializing the setting control and the effective control, the data comprises a set of one or more permission links. In some embodiments, a permission link between a first permission and a second permission is a required link in which allowance for the first permission requires an allowance for the second permission. In some embodiments, a permission link between a first permission and a second permission is an included link in which an effective value for the first permission in included with an allowance for the second permission. Furthermore, the method may further comprise, setting, by the client, an editability of a setting control of the first permission as uneditable.

In some embodiments of the computer-implemented method, updating comprises: a) updating, by the client, an effective value that is dependent on a change made to the selected setting value; if the updated effective value changes: b) updating, by the client, an information link associated with the changed effective value; c) updating, by the client, an editability of a setting value that depends on the change made to the selected setting value; d) updating, by the client, a setting value that depends on the change made to the selected setting value; and repeating steps (a)-(d) if the setting value that depends on the change made to the selected setting value changes.

In another aspect, a computing apparatus is provided for managing a set of permissions on a user interface, the apparatus comprising: a processor; and a memory storing instructions that, when executed by the processor, configure the system to: retrieve, by a client, from a server, a setting value and an inherited value for each permission in the set of permissions; generate, by the client, an effective value for each permission from the setting value and the inherited value; initialize, by the client, a setting control and an effective control for each permission, with data from the server; offer, by the client, an information link for each effective value that has a conflict with a corresponding setting value; determine, by the client, an editability of one or more setting values with the data from the server; display, by the client, the user interface on a device to an administrator; change, by the administrator, a selected setting value via the user interface; update, by the client, one or more effective values changed by changing the selected setting value; one or more information links changed by changing the selected setting value; one or more editabilities changed by changing the selected setting value; and one or more setting values changed by changing the selected setting value; and transmit, by the client, to the server, one or more updated setting values and one or more updated effective values.

In some embodiments of the apparatus, when initializing, the instructions further configure the apparatus to: initialize, by the client, the setting control and the effective control for each permission from data that comprises a set of one or more permission links. In some embodiments, a permission link between a first permission and a second permission is a required link in which allowance for the first permission requires an allowance for the second permission. In some embodiments, a permission link between a first permission and a second permission is an included link in which an effective value for the first permission in included with an allowance for the second permission. Furthermore the instructions may further configure the apparatus to: set, by the client, an editability of a setting control of the first permission as uneditable.

In some embodiments of the apparatus, when changing the selected value, the instructions further configure the apparatus to: a) update, by the client, an effective value that is dependent on a change made to the selected setting value; if the updated effective value changes: b) update, by the client, an information link associated with the effective value that has changed; c) update, by the client, an editability of a setting value that depends on the change made to the selected setting value; d) update, by the client, a setting value that depends on the change made to the selected setting value; and repeat steps (a)-(d) if the setting value that depends on the change made to the selected setting value changes.

In another aspect, a non-transitory computer-readable storage medium is provided for managing a set of permissions on a user interface, the computer-readable storage medium including instructions that when executed by a computer, cause the computer to: retrieve, by a client, from a server, a setting value and an inherited value for each permission in the set of permissions; generate, by the client, an effective value for each permission from the setting value and the inherited value; initialize, by the client, a setting control and an effective control for each permission, with data from the server; offer, by the client, an information link for each effective value that has a conflict with a corresponding setting value; determine, by the client, an editability of one or more setting values with the data from the server; display, by the client, the user interface on a device to an administrator; change, by the administrator, a selected setting value via the user interface; update, by the client, one or more effective values changed by changing the selected setting value; one or more information links changed by changing the selected setting value; one or more editabilities changed by changing the selected setting value; and one or more setting values changed by changing the selected setting value; and transmit, by the client, to the server, one or more updated setting values and one or more updated effective values.

In some embodiments of the computer-readable storage medium, when initializing, the instructions further configure the computer to: initialize, by the client, the setting control and the effective control for each permission from data that comprises a set of one or more permission links. In some embodiments, a permission link between a first permission and a second permission is a required link in which allowance for the first permission requires an allowance for the second permission. In some embodiments, a permission link between a first permission and a second permission is an included link in which an effective value for the first permission in included with an allowance for the second permission. Furthermore the instructions may further configure the computer to: set, by the client, an editability of a setting control of the first permission as uneditable.

In some embodiments of the apparatus, when changing the selected value, the instructions further configure the computer to: a) update, by the client, an effective value that is dependent on a change made to the selected setting value; if the updated effective value changes: b) update, by the client, an information link associated with the effective value that has changed; c) update, by the client, an editability of a setting value that depends on the change made to the selected setting value; d) update, by the client, a setting value that depends on the change made to the selected setting value; and repeat steps (a)-(d) if the setting value that depends on the change made to the selected setting value changes.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates an example of changing a setting according to FIG. 7.

DETAILED DESCRIPTION

Figure 1:
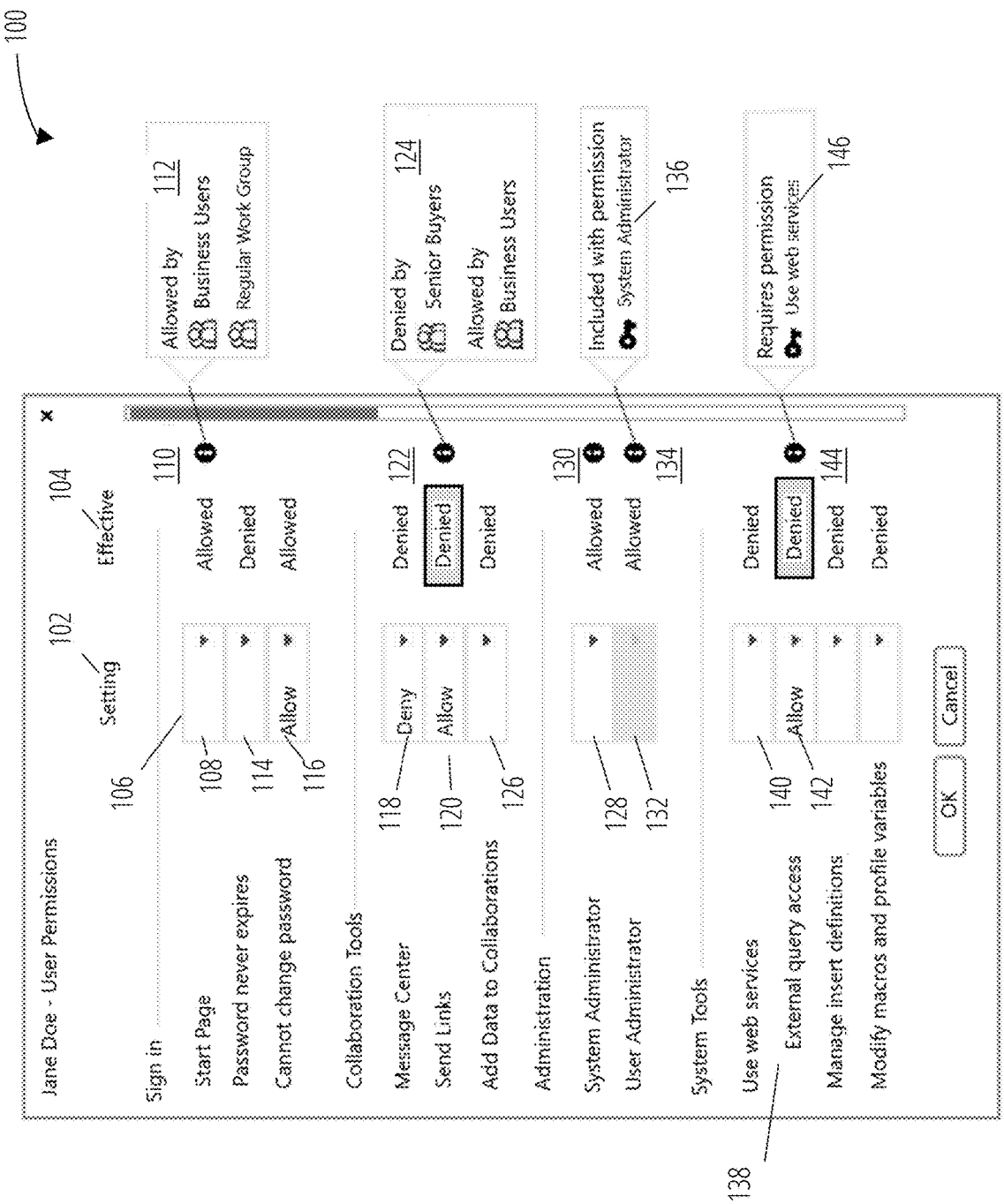
FIG. 1 illustrates a user interface in accordance with one embodiment.

In the present document, any embodiment or implementation of the present subject matter described herein as serving as an example, instance or illustration, and is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a skeleton user interface 100 in accordance with one embodiment.

The skeleton user interface 100 is accessed by an individual who controls permissions (or privileges) of users in the structured user-environment. As an example, this may be an administrator. In some embodiments, this can be a user administrator or a system administrator. In FIG. 1, the user interface 100 is for permissions accorded to user "Jane Doe". In general, "Jane Doe" does not have access to user interface 100. However, if "Jane Doe" is designated as an administrator, then she will have access to user interface 100.

Each item which is associated with a setting is considered its own permission in the system. For example, "Start-Page", "Password Never Changes", etc., are each considered as an individual permission. When a permission is checked by the program at runtime, the value of a permission may be "allowed" or "denied".

In conventional UIs for privilege settings, there is only one column displayed to an administrator—namely the values shown for column settings 102. However, in embodiments of non-binary privileges in a structured user environment, for each user of the structured environment, there is provided a column of manual settings 102, and a column of effective values 104. By "effective", it is meant "in effect, currently true, the actual fact". That is, the effective value is the actual value of the permission at the moment, determined by resolving the setting against other factors.

However, the setting for a permission may, in certain circumstances, control and change its effective value. In other circumstances, the effective value is determined by other permissions which are not over-ridden by manual settings 102. A number of examples are discussed below.

In the embodiment of the user interface 100 shown in FIG. 1, the default value for each setting is "blank". It can be changed to "Allow" or "Deny" manually by the administrator through menu controls 106. The default effective value of any given permission is "Denied"—that is, at the onset, before any permissions are granted at all, they are all effectively denied. That is, every permission shown in user interface 100 is effectively denied to user "Jane Doe", unless it is changed by either changing the setting via menu controls 106 or through some other form of permission (e.g. membership by "Jane Doe" to a group or links to other permissions), as discussed below.

Furthermore, the default value for a setting value is "Blank". The "Blank" value implies that at the outset, the system is not choosing to set "Allow" directly. The permission inherits its effective value from a parent group or some other permission link, rather than setting it as "Allow" by the setting value. The "Blank" value also implies that at the outset, the system is not choosing to set "Deny" directly.

In all embodiments of the tool, a "Deny" or "Denied" value over-rides an "Allow" or "Allowed" value, while an "Allow" or "Allowed" value over-rides a "Blank" value. Examples are provided below.

User interface 100 lists a number of permissions "Jane Doe". For the permission "Start Page", setting control 108 is set at its default value, namely, "Blank". At the outset of the UI, the default effective value is set as "Denied". However, the present UI indicates that the effective value is now "Allowed". Since the effective value was not changed from "Denied" to "Allowed" due to the presence of an "Allow" value in setting control 108, this implies that the change has occurred elsewhere. This is indicated by an indicator, or "Infotip" 110, that provides information about the source of the change. Rather than having the administrator search manually through various user groups and/or security/controls (along with their respective privilege settings) to find where the source of the change is, dialog box 112 associated with "Infotip" 110, immediately provides the answer. By opening or clicking "infotip" 110, dialog box 112 opens, immediately providing an explanation of the source of the effective value of permission inheritance. The administrator can immediately see that the effective privilege for "Jane Doe" for the "Start Page" is allowed, by virtue of the fact that "Jane Doe" belongs to two groups, "Business Users" and "Regular Work Group", each of which allows members of the group to have access to the "Start Page". The default value of "Denied" of the effective privilege has been changed to "Allowed"—not directly, due to the presence of an "Allow" value in setting control 108, but by membership of "Jane Doe" in each of the two groups.

For the permission "Password never expires", setting control 114 is set at its default value—namely blank. The effective value is also shown as its default value—namely "Denied", without the presence of an "Infotip". The absence of an "Infotip" indicates that the effective value is due to its default setting, and not due to membership with a group for which "Password never expires" is set as "Denied", or due to linkage with another permission for which for which "Password never expires" is set as "Denied".

For the permission "Cannot change password", setting control 116 has the value "Allow". This automatically changes the default effective setting from "Denied" to "Allowed". Furthermore, the absence of an "Infotip" indicates that the effective value is due solely to the setting value. The absence of an "Infotip" indicates that the effective value is not due to membership with a group for which "Cannot change password" is set as "Allowed", or due to linkage with another permission for which for which "Cannot change password" is set as "Allowed".

Before leaving the category "Sign in", the following should be noted about the permission "Start Page". The effective value is "Allowed" by virtue of "Jane Doe's" membership with two groups, each of which have an "Allowed" setting for "Start Page". However, if setting control 108 were changed from "blank" to "Deny", this would override "Jane Doe's" inherited allowance from each group, and the effective value would be changed to "Denied". This is so because a denial overrides an allowance. Even though "Jane Doe" belongs to at least one group where "Start Page" is allowed, denial of that privilege by the administrator via setting control 108 overrides the group membership allowance.

There can be instances where there is a conflict between a setting and an effective value, due to an inheritance of permissions. An example of a conflict between a setting and an effective value due to inheritance permissions is discussed with respect to the permission "Collaboration Tools" in FIG. 1. For the permission "Send Links", the setting control 120 has been set to "Allow" by the administrator. However, the effective permission is set as "Denied", and "infotip" 122 is provided. That is, the "Allow" value in setting control 120 conflicts with other permission settings, as indicated by the presence of "infotip" 122. In this case the conflict is due to the inheritance of a "Deny" value from the "Senior Buyers" group, as shown in dialog box 124. Rather than manually search through all of "Jane Doe's" group memberships (and their respective privileges) and other security settings, the administrator can open "infotip" 122 to see dialog box 124 with an explanation of the source of the denial. The dialog box 124 indicates that "Jane Doe's" permission to "Send Links" is set by membership to two different groups: "Senior Buyers" and "Business Users". While "Business Users" allow all members of the group to "Send Links", members of the groups "Senior Buyers" are denied permission for such action. Since a denial overrides an allowance, the effective value is set to "Denied", due to "Jane Doe's" membership in the group "Senior Buyers". The administrator immediately sees the source of the conflict, can diagnose it and address it quickly. For example, the administrator may make a change to the privileges of the "Senior Buyers" group to allow members to "Send Links" (i.e. change "Denied" for the permission "Send Links" by "Senior Buyers" group to "Allowed")—which then enables "Jane Doe" to "Send Links". Or the administrator may make a change by removing "Jane Doe" from membership with the "Senior Buyers" group, thereby providing permission to "Jane Doe" to "Send Links" by virtue of either her membership to the group "Business User" or by a setting control 120 setting of "Allow".

It is noted for the remaining permissions under the heading "Collaboration Tools", there are no conflicts between the respective setting value and the respective effective value. That is, there are no "Infotips" available to explain a conflict resolution. For the permission "Message Center", the setting control 118 has been set "Deny". This simply re-affirms the default effective value for "Message Center" as "Denied". "Jane Doe" has no other permissions (via inheritance from group membership or links to other permissions). For permission "Add Data to Collaborations", the situation is as described for the permission "Cannot change password" in the "Sign In" category: setting control 126 is at its default value of "blank", while the effective value is also at its default value "Denied".

There can be instances where there is a conflict between a setting and an effective value, due to links with one or more other permissions. This is different from an inherited permission, in which a permission is inherited via membership with one or more groups. An example of a conflict between a setting and an effective value due to a permission link is discussed with respect to the category "Administration" in FIG. 1. For the permission "System Administrator", the setting control 128 is at its default "blank" value. However, the effective value has been changed from its default value "Denied" to "Allowed" and "infotip" 130 leads to a dialog box (not shown) which explains why. If the administrator opens "infotip" 130 a dialog box would open to explain the source of the effective value. In this case, while it is not shown in FIG. 1, it could be that "Jane Doe" has membership in a group which the permission "System Administrator" is allowed. This is the same situation as discussed above for the permission "Start Page".

The next permission, "User Administrator" in the heading "Administrator" has its setting control 132 rendered inaccessible. That is, the setting control cannot be edited. This inaccessibility is indicated by setting control 132 fully shaded in grey, and implies there are no means to alter setting control 132. This implies that the administrator cannot make any changes to the effective value for the permission "User Administrator". In addition, the effective value is "Allowed" and has associated "infotip" 134 that, once opened, provides dialog box 136 that explains the resolution between the setting value (set as inaccessible) and the effective value (set as "Allowed"). Dialog box 136 indicates that the effective value is "Allowed" due to the fact that the permission for "User Administrator" is automatically included with the permission for "System Administrator". Since the effect value for "System Administrator" is "Allowed", the effective value for "User Administrator" is also "Allowed". Due to the link between "User Administrator" and "System Administrator", setting control 132 cannot be used to change the effective value of "User Administrate". Therefore, setting control 132 is rendered inaccessible.

In the heading "Administration", the reason for the effective value of "Allowed" for the permission "User administrator" is different from that of the example of the permission "System Administrator". In the case of the permission "System Administrator", the effective value is set as "Allowed" by virtue of "Jane Doe's" membership with a "Systems Administrator" group—that is, by an inheritance permission. In the case of "User Administrator", the effective value is set to "Allowed" by virtue of its link to the value of another permission (namely, "System Administrator").

In the heading "System Tools", each of the permissions "Use web services", "Manage insert definitions" and "Magnify macros and profile variables" have their respective setting control set to the default value "blank", and the corresponding effective value remaining at the default value of "Denied". Furthermore, none of the effective values has an associated "Infotip", indicating that for each of these sub-categories, there is no conflict between the setting value and the corresponding effective value. That is, "Jane Doe's" various group memberships have no relation to any of the permissions "Use web services", "Manage insert definitions" and "Magnify macros and profile variables". Nor do these permissions have links to other permissions.

On the other hand, the permission "External query access" is not simply an independent permission, but depends on the permission "User web service". In FIG. 1, this dependency is shown visually by the visual indentation 138. However, other ways of visualizing the dependency are possible. Setting control 142 is set to "Allow", whereas the effective value for "External query access" is "Denied". This resolution of this conflict is highlighted by "infotip" 144, which when opened, leads to dialog box 146 that explains the nature of the dependency of "External query access" on "User web service". That is, if "Use web service" is denied, then the dependent permission "External query access" is denied automatically. Since "Jane Doe" has an effective value of "Denied" for "Use web service", she will also have an effective value of "Denied" for the dependent permission "External query access". The setting control 142 setting of "Allowed" cannot override the effective value. Rather than search manually for the various permissions and their interrelationships, "infotip" 144 and dialog box 146 immediately provide the administrator an explanation of the conflict between setting control 142 and the effective value. One way to allow "Jane Doe" to be allowed "External query access" is to change the effective value of "Use web service" to "Allowed" by changing the setting control 140 of the "parent" permission "Use web service" to "Allow", thereby changing its effective value to "Allowed". This changes the dependent permission "External query access" to "Allowed" due to its dependency on "Use web services". Such a change happens irrespective of whether the administrator leaves setting control 142 blank or changes it to "Allow".

Figure 2:
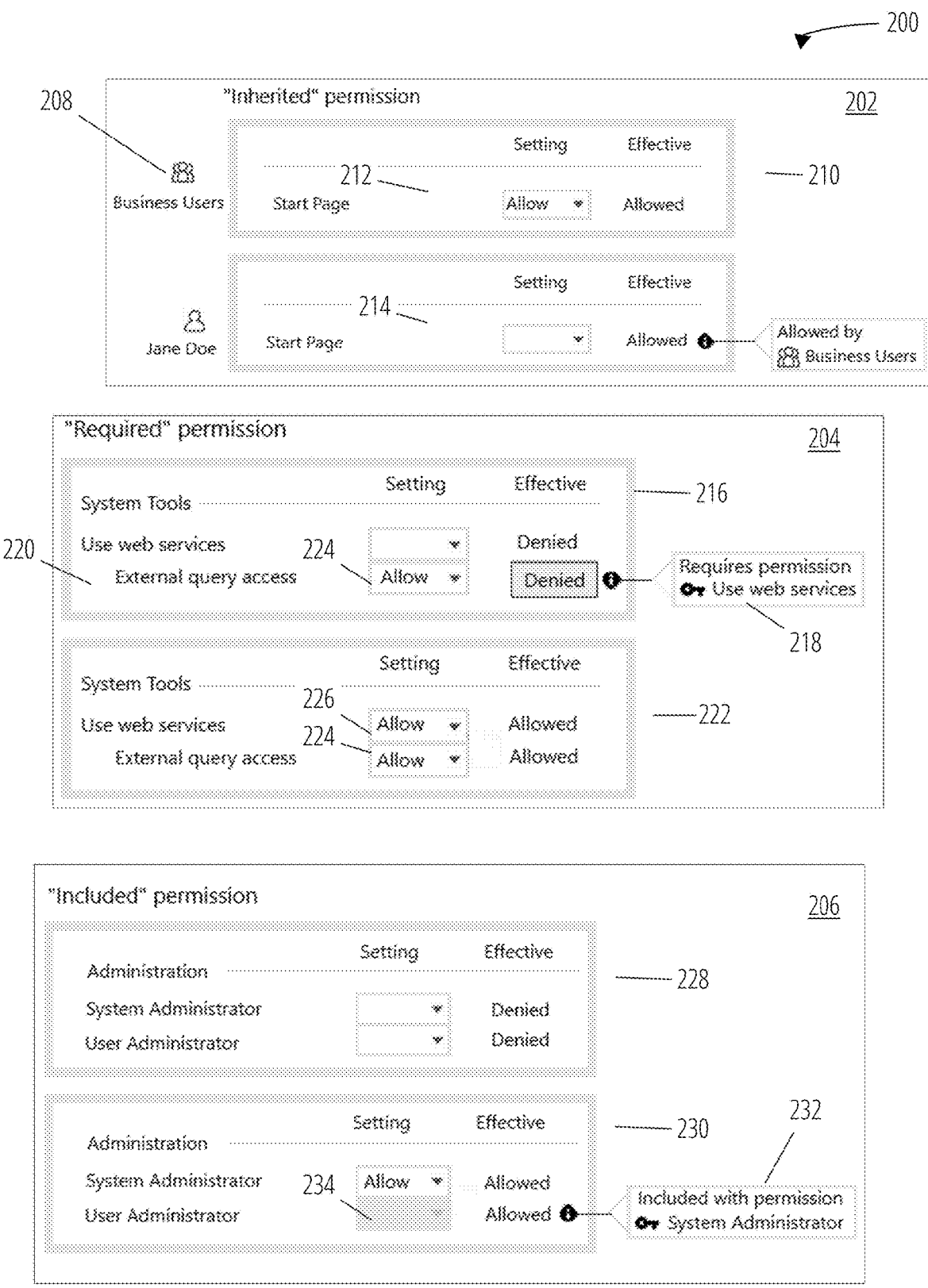
FIG. 2 illustrates various permissions in accordance with one embodiment.

The various types of permissions ("inherited", "dependent" and "included") are discussed in FIG. 2.

FIG. 2 illustrates various permissions 200 in accordance with one embodiment.

Inherited permission 202 illustrates an example where a permission is inherited due to membership with a group. User "Jane Doe" is a member of group "Business Users" 208. She inherits permission values from her groups. In this case, "Business Users" 208 are allowed to view the "Start Page", as seen from the group's permission dialog box 210, where an administrator has set the menu control 212 for the setting of "Start Page" to "Allow", thereby changing the effective value from the default "Denied" to "Allowed". The ability to view "Start Page" is not directly granted to Jane's individual permission through the setting control 214, but it is effectively allowed by inheriting the permission from the group "Business Users" 208.

Required permission 204 illustrates an example where the allowance of first permission requires the allowance of a second permission. That is, the first permission depends on the second permission. As shown in box 216, "External query access" cannot be effectively allowed if the user does not also have an allowance for "Use web services". "Use web services" has its setting and effective value both set at their respective default setting, thereby rendering "Use web services" denied. "External query access" depends on its parent permission "Use web services", and is thus denied—even though the setting control 224 has been set to "Allow" by an administrator. Dialog box 218 explains the reason for the denial. The dependency is indicated by the visual indentation 220.

In box 222, an alternate situation is shown for "Use web services" and "External query access". The setting control 226 for "Use web services" is set to "Allow", thereby rendering its effective value to "Allowed". Due to the permission dependency of "External query access" on "Use web services", "External query access" is allowable. The setting control 224 can be set to any value; it is set to "Allow" and thus the effective value is "Allowed".

Included permission 206 illustrates an example where a permission is included due to a permission link between the permission and another permission. Some permissions automatically and necessarily grant other permissions that would otherwise have been optional. For example, the permission "Users Administrator" may or may not be granted on its own, as shown in box 228. However, as shown in box 230 and dialog box 232, a user with the permission "System Administrator" also has the permission "Users Administrator" automatically and necessarily. Such a permission cannot be revoked by the administrator—therefore setting control 234 is rendered inaccessible.

Figure 3:
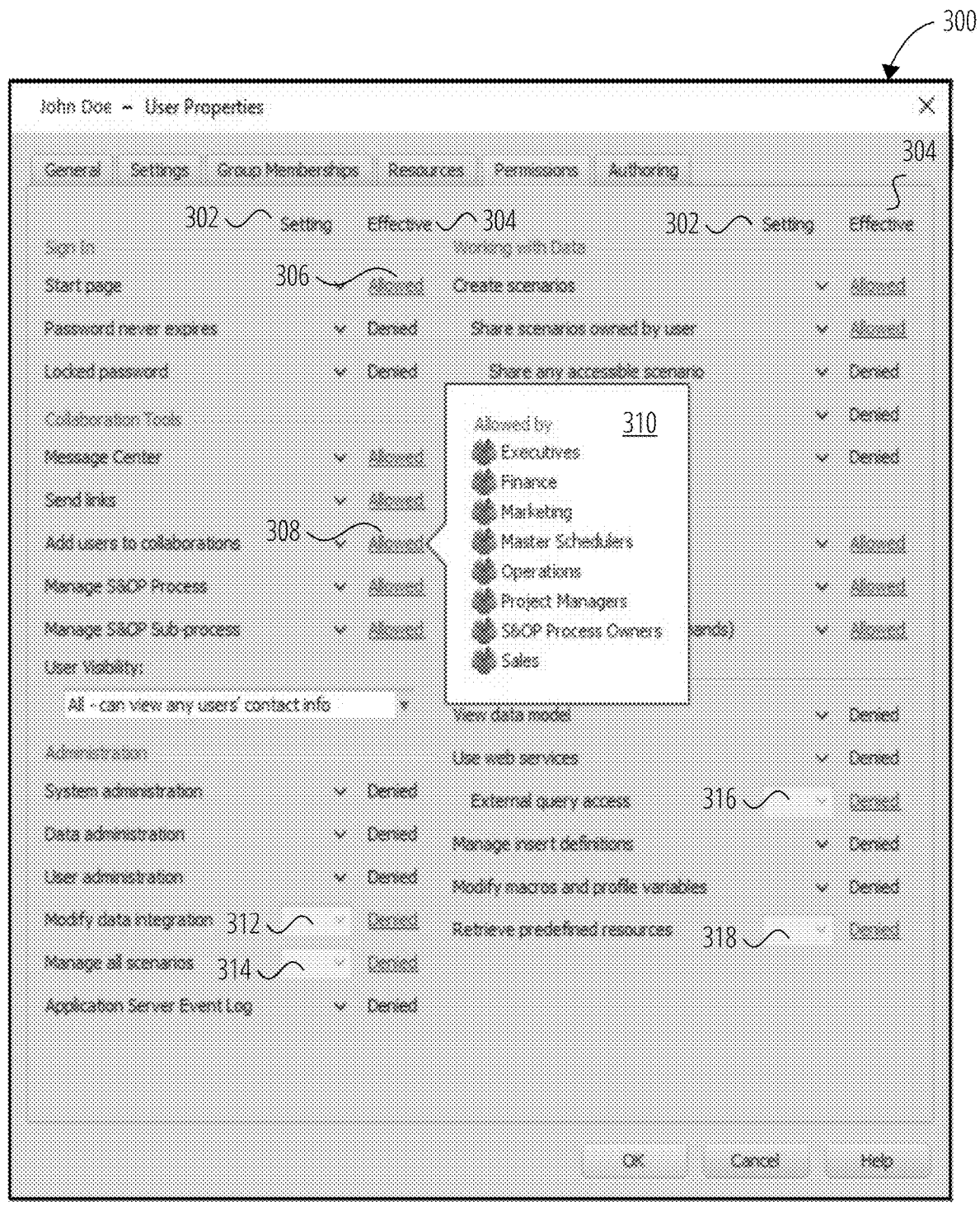
FIG. 3 illustrates a user interface 300 in accordance with one embodiment.

FIG. 3 illustrates a user interface 300 in accordance with one embodiment. In FIG. 3, the "Permissions" tab of the user properties of a user named "John Doe" is shown. As with FIG. 1, user interface 300 can only be accessed by an administrator, and not by any user who does not have the privilege of an administrator. In some embodiments, this can be a user or a system administrator. As in FIG. 1, there are a series of permissions, each of which has a setting 302 and an effective value 304. Furthermore, for each permission, the default effective value is set as "Denied", and the default setting is blank.

Unlike the skeleton user interface 100 of FIG. 1, rather than an icon for "Infotips", a hyperlink is provided, which when opened, provides a dialog box that explains an effective value. Furthermore, setting controls are not shown, unless they are changed from the default setting of "blank" to "Allow" or "Deny". In addition, the setting control is shown if it is rendered inaccessible. Examples are discussed as follows.

An example of a hyperlink is shown for the "Start Page" permission, where the default effective value has been changed from "Denied" to "Allowed". The effective value "Allowed" has a hyperlink 306, to explain how this change has been made since it has not been made by setting the menu control for "Start Page" to "Allow". Clicking on the hyperlink opens a dialog box (not shown) that indicates the user "John Doe" belongs to at least one group for which "Start page" is allowed. That is, the effective value of "Allowed" is due to an inheritance permission (see an example of inherited permission 202 in FIG. 2).

This is further illustrated by the permission "Add users to collaboration" in the "Collaboration Tools" heading. The effective value has been changed from the default "Denied" to "Allowed", with a hyperlink 308, since the change is not due the administrator changing the setting value to "Allow" via the setting control. The hyperlink 308, when accessed, opens a dialog box 310 that shows that this privilege is due to the membership of user "John Doe" to the groups "Executives", "Finance", "Marketing", "Master Schedulers", "Operations", "Project Managers", "S&OP Process Owners" and "Sales", each of which has the "Add users to collaborations" privilege set "Allowed". That is, the effective value of "Allowed" is due to an inheritance permission (see an example of inherited permission 202 in FIG. 2).

In FIG. 3, menu controls 312, 314, 316 and 318 have each been disabled, and the corresponding effective value for each is "Denied" with a hyperlink. When each hyperlink is opened, there is provided an explanation of why each effective value cannot be overridden by its respective setting control. This is further discussed in FIG. 6.

Figure 4:
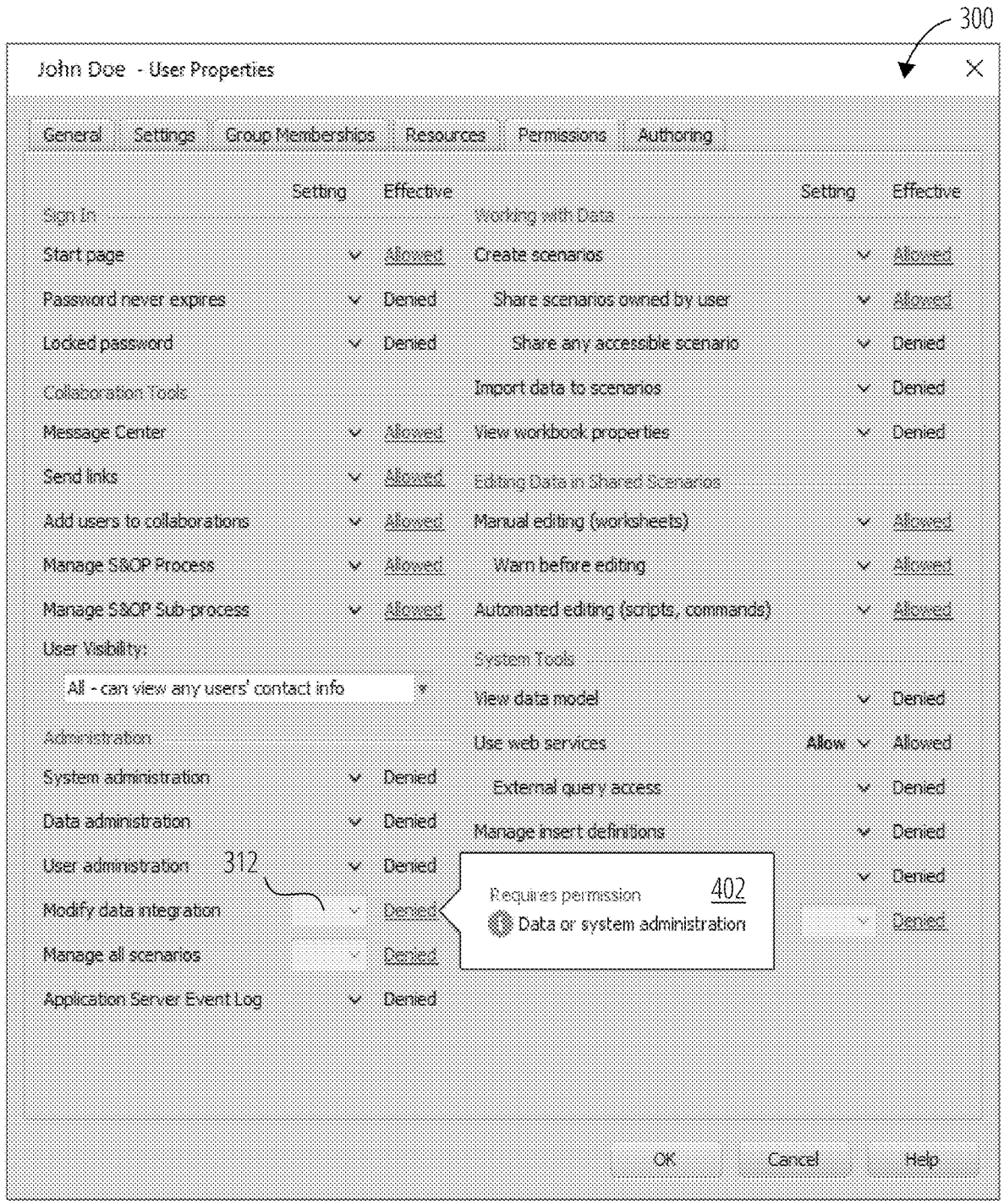
FIG. 4 illustrates the user interface shown in FIG. 3.

FIG. 4 illustrates the user interface shown in FIG. 3. Setting control 312 is disabled for permission "Modify data integration"; its effective value is "Denied" and hyperlinked. When the hyperlink is accessed, dialog box 402 opens to indicate that the "Denied" permission cannot be overridden by setting control 312 since this permission requires permission from either "Data administration" or "System administration". As can be seen, each of these is effectively denied. Thus, the reason for denial is due to two required permissions, each of which is denied (see an example of a required permission 204 in FIG. 2).

Figure 5:
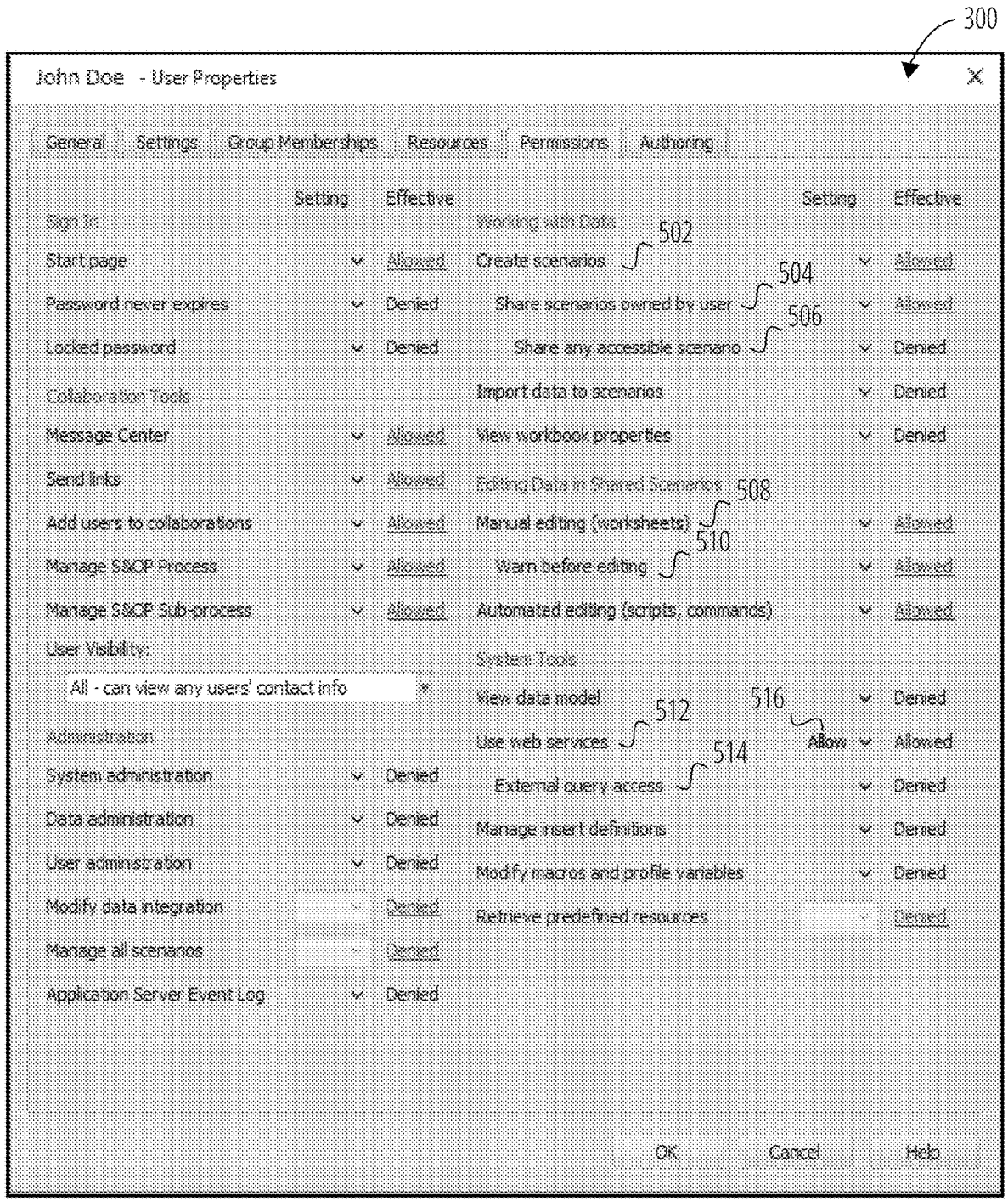
FIG. 5 illustrates the user interface shown in FIG. 3.

FIG. 5 illustrates the user interface shown in FIG. 3. In FIG. 5, dependencies between sub-categories 502-514 are shown, and discussed as follows.

In FIG. 5, the permission "Create Scenarios" 502 has a dependent permission "Share scenarios owned by user" 504; the dependency is indicated by the visual indentation of "Share scenarios owned by user" 504 relative to its parent "Create Scenarios" 502. In turn, "Share scenarios owned by user" 504 has a dependent permission "Share any accessible scenario" 506; the dependency is indicated by the visual indentation of "Share any accessible scenario" 506 relative to its parent "Share scenarios owned by user" 504.

For permission "Create Scenarios" 502, its effective value has been changed from the default value of "Denied" to "Allowed" while maintaining its setting value as blank (i.e. the default value). That is, the effective value has been changed not via the setting control, and there is a conflict between the setting value and the effective value. Therefore, the effective value of "Allowed" is hyperlinked. When this hyperlink is opened, a dialog box (not shown) opens to explain why "John Doe" is allowed to "Create Scenarios".

For dependent permission "Share scenarios owned by user" 504, the effective setting has been changed from the default value "Denied" to "Allowed", without recourse to changing the menu control setting from blank to "Allow". Therefore, the effective value of "Allowed" is hyperlinked to provide an explanation of the resolution. When this hyperlink is opened, an explanatory box (not shown) opens to explain why "John Doe" is allowed to "Share scenarios owned by user".

For dependent permission "Share any accessible scenario" 506, the effective setting remains at its default value "Denied", while the menu control remains at its default value "blank". Since there is no hyperlink associated with the effective value "Denied", there is no inherited permission, nor required permission for permission "Share any accessible scenario" 506 with respect to the parent permission "Share scenarios owned by user" 504.

Another example of a set of dependent permissions is the set of "Manual editing (worksheets)" 508 and "Warn before editing" 510. The permission "Manual editing (worksheets)" 508 has a dependent permission "Warn before editing" 510; the dependency is indicated by the visual indentation of "Warn before editing" 510 relative to its parent "Manual editing (worksheets)" 508.

Like the permission "Create Scenarios" 502, the permission "Manual editing (worksheets)" 508 has had its effective value changed from the default value of "Denied" to "Allowed" while maintaining its setting value as blank (i.e. the default value). That means the effective value has been changed not via the setting control. Therefore, the effective value of "Allowed" is hyperlinked. When this hyperlink is opened, a dialog box (not shown) opens to explain why "John Doe" is allowed "Manual editing (worksheets)". The explanation box will show either an inherited permission or a link to another permission.

For dependent permission "Warn before editing" 510, the effective setting has been changed from the default value "Denied" to "Allowed", without recourse to changing the setting control setting from blank to "Allow". Therefore, the effective value of "Allowed" is hyperlinked. When this hyperlink is opened, a dialog box (not shown) opens to explain why "John Doe" is allowed to "Warn before editing". While the dialog box is not shown, the effective value for "Warn before editing" 510, is "Allowed" because it requires permission based on the parent "Manual editing (worksheets)" 508.

Yet another example of a set of dependent permissions is the set of "Use web services" 512 and "External query access" 514. The permission "Use web services" 512 has a dependent permission "External query access" 514; the dependency is indicated by the visual indentation of "External query access" 514 relative to its parent "Use web services" 512.

Like each of the permissions "Create Scenarios" 502 and "Manual editing (worksheets)" 508, the permission "Use web services" 512 has had its effective value changed from the default value of "Denied" to "Allowed". However, unlike the other two sub-categories, the permission "Use web services" 512 has had the effective value changed solely due a change of setting control 516 from the default "blank" to "Allow". Since there is no hyperlink associated with the effective value, this implies that there is no other way for the "Allowed" value to be effective. As an example, if "John Doe" belonged to one or more external groups which allowed access to "Use web services", then the effective value of "Allowed" would have a hyperlink with an associated explanatory box.

For dependent permission "External query access" 514, the effective setting remains at its default value "Denied", while the setting control remains at its default value "blank". Since there is no hyperlink associated with the effective value "Denied", there are no required permissions for permission "External query access" 514 with respect to the parent permission "Use web services" 512.

Figure 6:
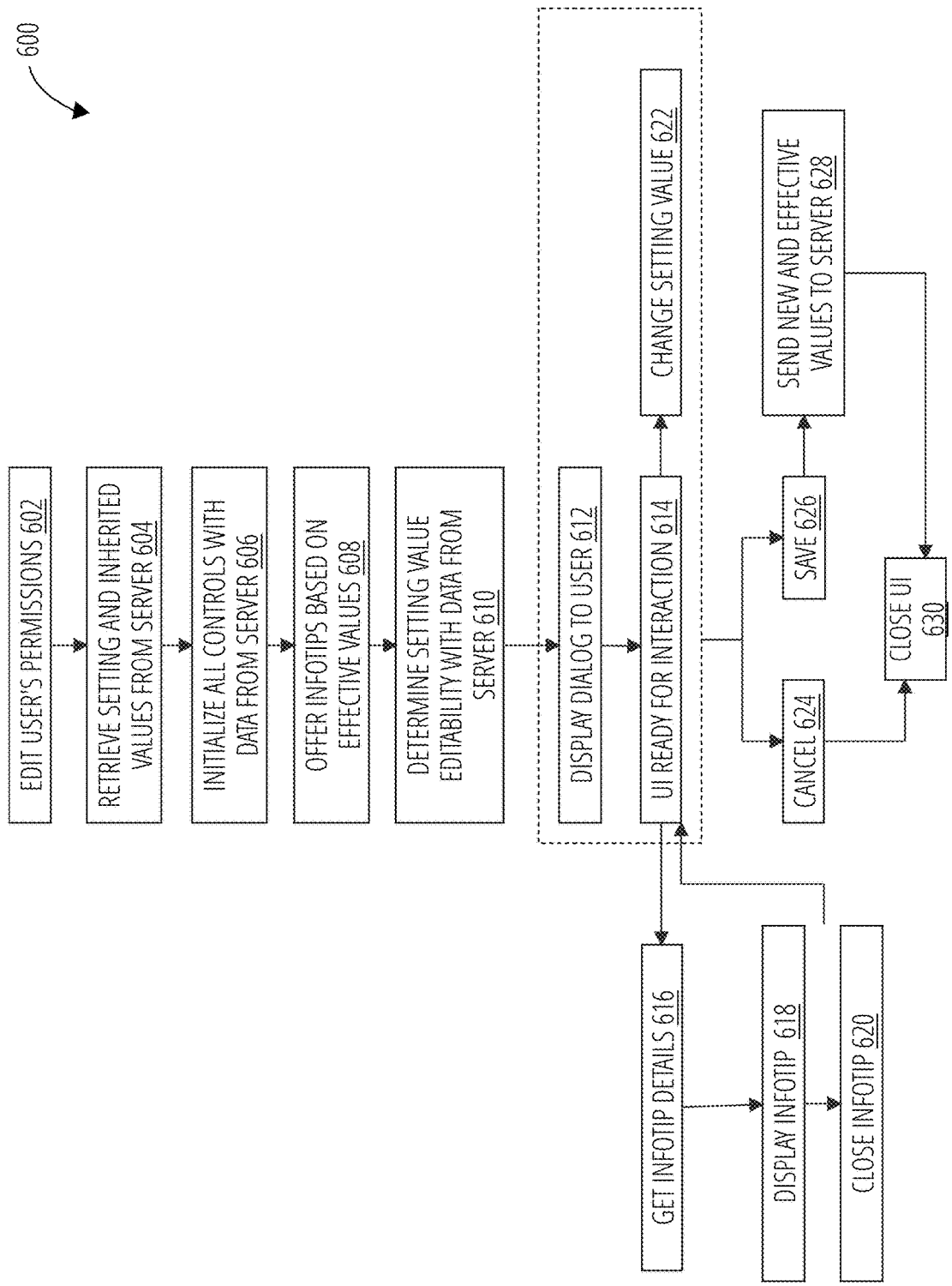
FIG. 6 illustrates a flowchart in accordance with one embodiment.

FIG. 6 illustrates a flowchart 600 in accordance with one embodiment.

Common Rules for Users, Groups and Permissions in the System

Every user in the system can be a member of any number of groups. Every group in the system can be a member of any number of groups, allowing complex hierarchies of groups to be created. Every group and every user can specify a setting of "Allow" or "Deny" for each permission in the system. If no value is specified, the permission is left blank (not set) by that user or group.

For any user or group there are three values for any permission:
1. The setting value, which is specified by that user or group. This is the value at the level of the observed user or group in the group hierarchy.
2. The inherited value, which is the result of combining all the setting values from all of the groups which the observed user or group is a member of, either directly or indirectly. Combination of permissions is based on the rule that "Deny" values supersede "Allow" values, which supersede the blank (not set) value.
3. The effective value, which is the result of combining the setting and inherited values of the observed user or group. If the combined effective value is "Allowed" then the observed user or group is granted the permission at runtime. If the combined effective value is either "Denied" or blank (not set) then the observed user or group is not granted the permission at runtime.

In order to access the user interface, an administrator requests to edit a user's (or a group's) permissions at step 602. Users granted either the "User Administration" or the "System Administration" permission have access to resources which list the users and groups present in the system. When logged in to the system through a client device, any one of these administrators is able to select individual users and groups in order to view or edit that user or group's permissions. This action fires an event which will initialize and then display the UI dialog. Before the user interface is ready for interaction, the following sequence of steps occur.

A request for the permission list of the user or group that the administrator is viewing is sent to the server at step 602. At step 604, the setting and inherited values are retrieved from the server. When the administrator begins editing a user's (or group's) permissions, the client (i.e. the program which the user or group is working with) sends a request to a server for the current set of setting and inherited permissions for that user or group. A setting permission has one of three values: blank, allow or deny. An inherited permission has one of three values: blank (i.e. no group membership), allow or deny. The setting and inherited values of every permission tied to that user (or group) are sent to the client.

A request for the permission list of the user or group that the administrator is viewing is sent to the server. The data returned from the server can be in XML, with all permissions transmitted under a common <Permissions> element. Each permission is transmitted as a <Permission> element which contains an <Id> element and which optionally contains an <S> element and optionally contains a <P> element.

The Id element contains a unique internal name for the permission. The S element, if present, contains the setting value for the permission, represented as either A (for "Allow") or D (for "Deny"). The P element, if present, contains the inherited (aka parent) value permissions. If either S or P is not present then that indicates the associated value is blank (that is, not set).

As an example, <Permission><Id>systemAdministration</Id></Permission> indicates that for the chosen user or group the permission for system administration does not have a setting value and does not inherit a value from any parent group. In the UI, this is displayed as a blank control for the setting and "Denied" for the effective value (since "Denied" is the default value for a permission when the setting value is blank).

As another example, <Permission><Id>systemAdministration</Id><S>A</S><P>A</P></Permission> indicates that for the chosen user or group, the permission for system administration has a setting value of "Allow" and inherits a value of "Allow" from at least one parent group. In the UI, this is displayed as an "Allow" control for the setting and "Allowed" for the effective value.

It is possible to transmit this value in other ways, including as more compact forms of XML, as JSON, a comma separated list, etc. The setting and inherited permission values can also be combined into a single field of information.

It is also possible that the rules linking various permission may be returned as part of this response or as a separate request and response.

On the client device, the XML is parsed and each <Permission> element is deserialized into a Permission object. Permission objects store the id, setting, inherited and effective value for a given permission. They have functions which allow other objects to register and deregister as listeners. The class also contains the serialization and deserialization logic for permissions. The effective value is calculated based on the setting and inherited value. After deserializing the information from the server, the inherited value never changes. If the setting value changes, then the effective value is recalculated. If either the setting or effective values changes, then events will be fired, notifying listeners that either the setting or effective value has changed.

At step 606, all menu controls are initialized using data from the server. Combobox controls may be used to display the setting permission on screen and non-editable Textfield controls can be used to display the effective permission on screen (as shown, for example in FIGS. 3-5). Other styles of UI controls can be used to achieve the same effect; these include list boxes, radio buttons, tables, sliders, etc., that may be used depending on the design of the UI.

Each settings control is linked to the settings property of the Permission object for the appropriate permission, which was created in the step above. Similarly, each of the effective controls is linked to the 'effective' property of the Permission object for the appropriate permission. The 'inherited' property is not editable or directly visible in the UI and is not linked to any control. As the UI controls are linked to the 'selected' and 'effective' values of the Permission object they represent, the client also looks up the linkages between the various Permissions and adds these links to the UI controls.

For example, the 'External query access' Permission object itself has no link to or knowledge of the 'Use web services' Permission object. However these two objects are linked according to the rules of the permission model—as in FIG. 2 or FIG. 5, for example, where 'External query access' is linked to "Use web services". To enable this linkage in the client UI, the setting control for 'External query access' will receive an additional link to the 'Use web services' Permission, so that if the 'Use web services' Permission object reports that it is effectively denied the 'External query access' setting control will be set to a blank value.

In some embodiments, as setting and effective controls are created, the dialog calls functions of an object called the PermissionValueInterlink in order to link the control to the associated permission object, as well as properties of other permission objects that have an effect on the value of the control. The PermissionValueInterlink object contains all of the rules governing links between permissions.

Functions provided by the PermissionValueInterlink, include:
  getPermissionEffectiveValue(String permissionId)
  getPermissionHasInfotipValue(String permissionId)
  getPermissionsettingValue(String permissionId)
  getPermissionsettingEditableCondition(String permissionId)
  initializeAllOnEffectivePermissionValueChangeHandlers( )

Each of these functions creates a map of Value objects, adding Value objects to the map as additional permissions are requested. Lazy initialization is used as it would otherwise be possible to create infinite loops during initialization.

For most permissions, the getPermissionEffectiveValue and getPermissionsettingValue return a Value object which links to the effective or setting property of the Permission object with the matching Id. There are some cases where these functions return a more complex value.

For example, the effective value of the "External Query Access" permission is based not only on the effective property of the Permission object for "External Query Access", but also on the effective properties of the "Data Administration", "System Administration" and "User Administration" Permission objects. In this case, the special rule for "External Query Access" is that it will be "Denied" if the user or group is any form of an administrator.

The initializeAllOnEffectivePermissionValueChangeHandlers adds handlers that ensure certain actions occur when the effective value of a Permission object changes. When the effective value changes, these handlers can change the setting of any other permission to "Allow", "Deny" or blank.

For example, a user has been granted both the "Use Web Services" and "External Query Access" permissions. The administrator editing that user's properties then changes the setting value of "Use Web Services" to "Deny". As a result of this action, the change handler for the "Use Web Services" effective property is triggered and that change handler clears the setting property of the "External Query Access" Permission object.

At step 608, Infotips based on effective values are offered. Effective controls may display a hyperlink to indicate that the effective value of the associated permission is affected by factors other than the setting value of the current user or group.

The UI control for infoTips is linked to the inherited value of the Permission object it represents. It can also be linked, depending on the rules of the permission model, to the effective value of other permission objects. If the permission it represents inherits a value from any group in the hierarchy, or if any of the other permissions it is linked to contains a value which affects the permission which this infoTip control represents, then the infoTip control will indicate that an infoTip is present for this permission.

In some embodiments, the Value object returned by getPermissionHasInfotipValue will be true if the permission is inherited from another group. In addition, other factors can affect whether or not an Infotip can be displayed.

For example, the presence of an Infotip for the "External Query Access" permission takes into account the effective properties of the "Data Administration", "System Administration" and "User Administration" and "Use Web Services" Permission objects. If any of the administration effective permissions are "Allowed", then an Infotip will be offered. Similarly, if the "Use Web Services" permission effective value is "Denied", then an Infotip will be offered.

At step 610, the editability of setting values is determined using data from the server. Setting controls are normally editable, but can be rendered non-editable depending on the values of system settings or other permissions. The Value object returned by getPermissionsettingEditableCondition controls this behavior.

For example, the "User Administration" setting will be rendered non-editable when the user is granted the "System Administration" permission. This is because within the rules of the permission system, any system administrator is also a user administrator. At the same time, the change handler for the "System Administration" permission effective property will change the setting value for "User Administration" to "Allow", indicating to the user that the setting value of the "User Administration" permission is now locked in the "Allow" state.

There are also cases where granting a permission forcibly grants one or more other permissions—This is the case for the 'Data Administration' permission (see FIG. 4 or FIG. 5), which is automatically granted when the user is granted the 'System Administration' permission. If the user has been granted the 'System Administration' permission, then the setting control for the 'Data Administration' permission will be disabled.

There are also cases where granting a permission forcibly removes one or more other permissions. This is the case for the 'External query access' permission (see FIG. 5), which is automatically cleared when the user is granted any of the 'System Administration', 'Data Administration' or 'User Administration' permissions. If the user has been granted any of these administration permissions then the setting control for the 'External query access' permission will be disabled.

It is also possible to create rules that can result in cases where denying a permission will forcibly grant a different permission. However, none exist in the UI and permission ruleset shown in FIG. 2-FIG. 5.

At step 612, the user interface is displayed to the user. At step 614, the UI is ready for interaction step 614 is a hub for a number of actions. For example, the administrator may choose to look at details of an Infotip (step 616-step 618-step 620). The administrator may also choose to change setting values (step 622), after which the changes can be cancelled (step 624) or saved to the server (step 626 and step 628), before closing the UI (step 630). A flowchart for changing setting values is illustrated in FIG. 7.

Figure 7:
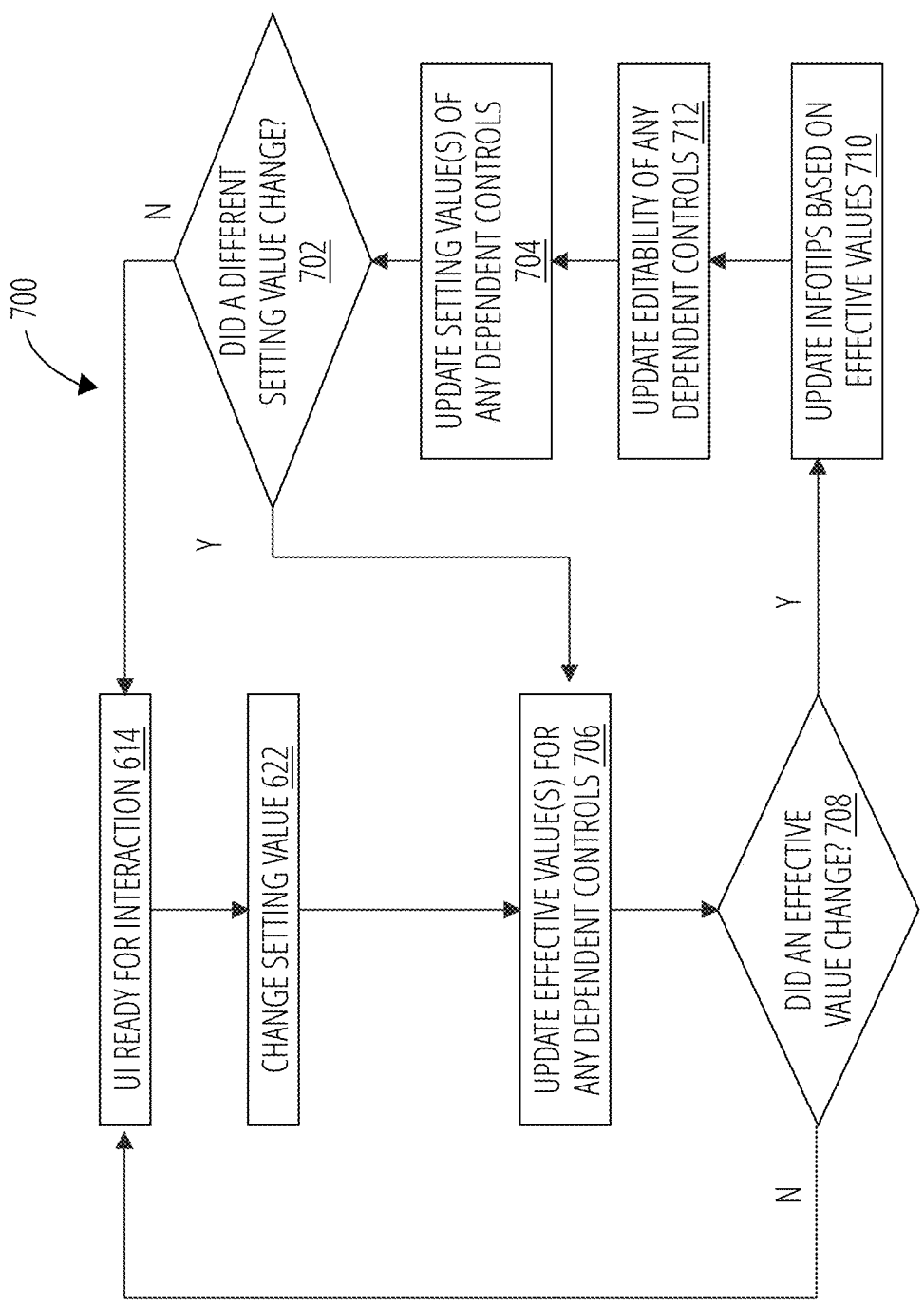
FIG. 7 illustrates a flowchart in accordance with one embodiment.

FIG. 7 illustrates a flowchart 700 outlining the steps for changing a setting value (step 622 in FIG. 6).

After changing a setting value at step 622, effective values that depend on the changed setting are updated at step 706. If no effective value changed, then the program returns to step 614, waiting for the next change in setting values. If, however, there is a change in an effective value, then the Infotips based on the changed effective value, are updated at step 710. In addition, the editability of any dependent menu controls is updated at step 712. This is followed by updating the setting value of dependent controls at step 704. If a setting value (other than the setting value that was changed at the outset at step 622) did not change, then, the program returns to step 614. Otherwise, if a different setting value did change, then effective values for dependent controls are once again updated at step 706, and the sequence of steps is followed once again, until the program returns to step 614. Three examples are provided to demonstrate this behavior.

In a second example, at step 614, an administrator is editing a user who has: a setting value of "Allow" for "Use Web Services", a blank setting value for "External Query Access" and is not inheriting any "Allow" or "Deny" values from any groups for either of these permissions. At step 622, the administrator changes the "Allow" setting for "Use Web Services" to a blank value. At step 706, the effective control for "Use Web Services" is updated as this effective value is dependent on the changed setting value. The effective value of "Use Web Services" changes from "Allowed" to "Denied" as the user no longer has a setting value of "Allow" for that permission. At decision block 708, there is a check to see if any effective value has changed. As the effective value for "Use Web Services" has changed (from "Allowed" to "Denied"), the program continues to step 710. In this case the presence of an Infotip for "External Query Access" must be updated. This Infotip now indicates that the user cannot be granted the "External Query Access" permission as the permission depends on the user also being granted the "Use Web Services" permission. At step 712, the editability of the "External Query Access" setting value is updated and it is made non-editable as the user has not been granted the "Use Web Services" permission. At decision block 702, there is a check to see if any setting values (other than "Use Web Services") changed. Since the setting value of "External Query Access" was already blank at the outset, it did not change. The program then returns to step 614.

FIG. 8 illustrates an example 800 of changing a setting according to FIG. 7.

For example, at step 614, an administrator is editing a user who has a setting value of "Allow" for "Use Web Services" and is also inheriting an "Allow" value (for "Use Web Services") from at least one group. Both of these set the effective value 802 as "Allowed". In FIG. 8, the inherited permission is from the group "Business Users". While the Infotip is shown in FIG. 8, it is understood that the content of the Infotip is shown if the administrator chooses to open it.

At step 622, the administrator editing the user's properties changes the "Allow" setting for "Use Web Services" to a "Blank" value.

At step 706, the effective control for "Use Web Services" is updated as this effective value is dependent on the changed setting value. However, since there is an inherited permission of "Allow", the effective value 802 remains as "Allowed" (since "Allowed" supersedes "Blank").

At decision block 708, there is a check to see if any effective value has changed between step 706 and step 622. Since the effective value 802 has not changed (i.e. it remains as "Allowed"), the program returns to step 614.

Figure 9:
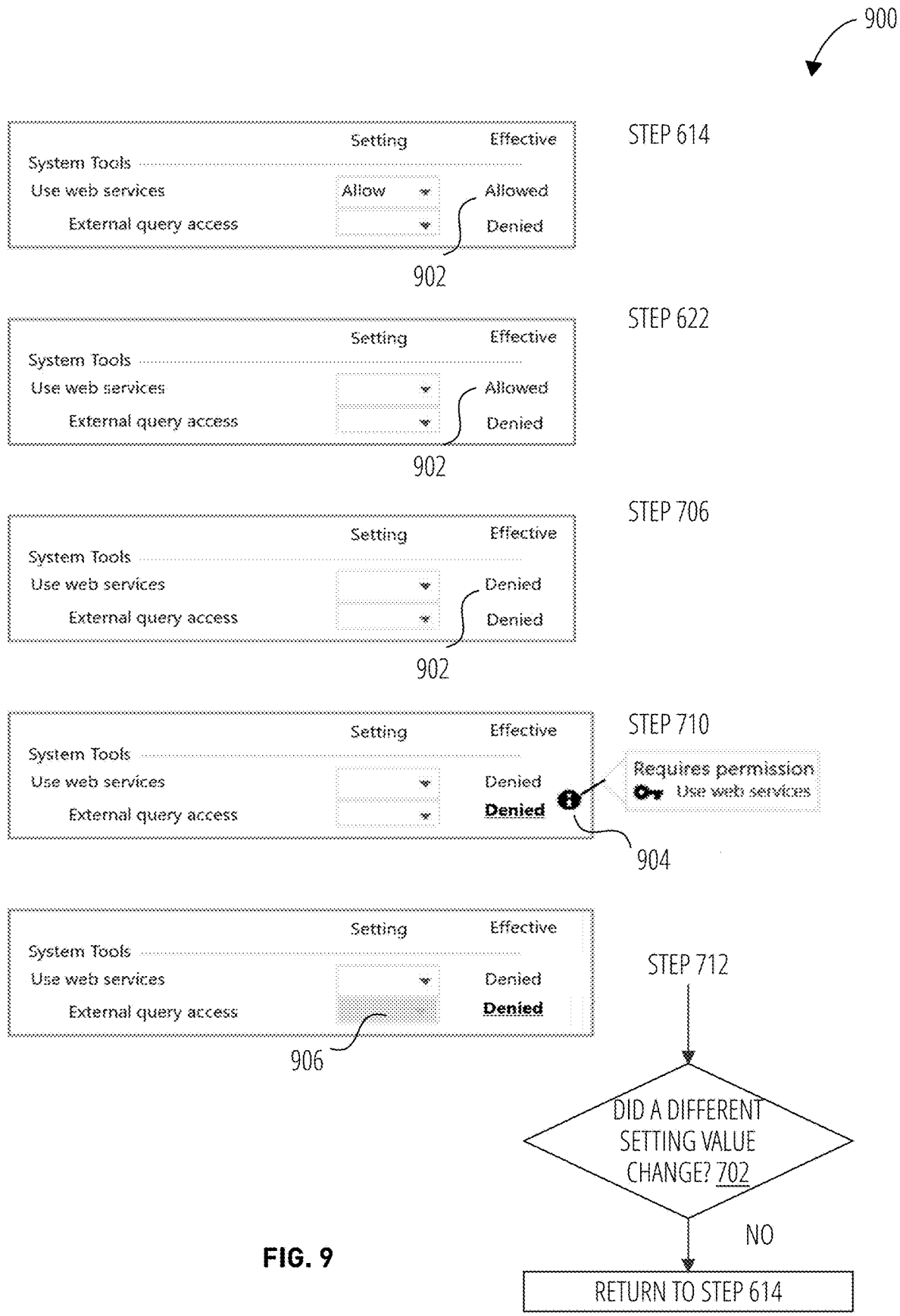
FIG. 9 illustrates an example of changing a setting according to FIG. 7.

FIG. 9 illustrates an example 900 of changing a setting according to FIG. 7.

In a second example, at step 614, an administrator is editing a user who has: a setting value of "Allow" for "Use Web Services", a blank setting value for "External Query Access" and is not inheriting any "Allow" or "Deny" values from any groups for either of these permissions. This sets the effective value 902 for "Use web services" to "Allowed" and the effective value for "External query access" to "Deny".

At step 622, the administrator changes the "Allow" setting for "Use Web Services" to a blank value.

At step 706, the effective control for "Use Web Services" is updated as this effective value 902 is dependent on the changed setting value. The effective value 902 of "Use Web Services" changes from "Allowed" (at step 622) to "Denied" (at step 706) as the user no longer has a setting value of "Allow" for that permission.

At decision block 708, there is a check to see if any effective value has changed. As the effective value for "Use Web Services" has changed (from "Allowed" to "Denied"), the program continues to step 710. In this case the presence of an Infotip 904 for "External Query Access" must be updated. This Infotip 904 now indicates that the user cannot be granted the "External Query Access" permission as the permission depends on the user also being granted the "Use Web Services" permission. While the Infotip 904 is shown in FIG. 9, it is understood that the content of the Infotip 904 is only shown if the administrator chooses to open it.

At step 712, the editability 906 of the "External Query Access" setting value is updated and it is made non-editable as the user has not been granted the "Use Web Services" permission. At decision block 702, there is a check to see if any setting values (other than "Use Web Services") changed. Since the setting value of "External Query Access" was already blank at the outset, it did not change. The program then returns to step 614.

Figure 10:
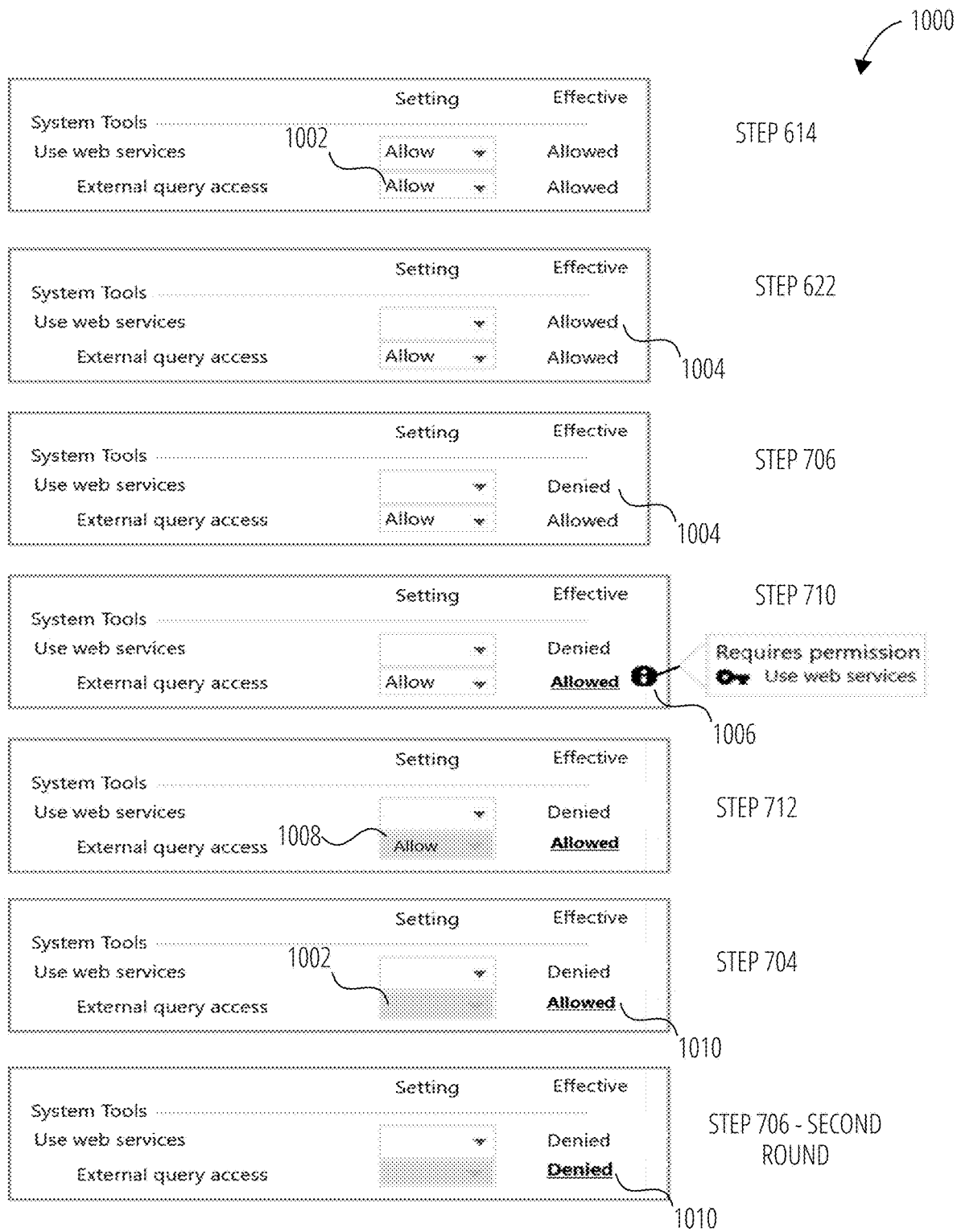
FIG. 10 illustrates an example of changing a setting according to FIG. 7.

FIG. 10 illustrates an example 1000 of changing a setting according to FIG. 7.

In a third example, at step 614, an administrator is editing a user who has: a setting value of "Allow" for "Use Web Services", a setting value 1002 of "Allow" for "External Query Access" and is not inheriting any "Allow" or "Deny" values from any groups for either of these permissions. These settings set the effective value 1004 of "Use web services" to "Allowed" and the effective value of "External query access" to "Allowed".

At step 622, the administrator editing the user's properties changes the "Allow" setting for "Use Web Services" to a "Blank" value.

At step 706, the effective control for "Use Web Services" is updated as this effective value is dependent on the changed setting value. The effective value 1004 of "Use Web Services" changes to "Denied" as the user no longer has a setting value of "Allow" for that permission.

At decision block 708 there is a check to see whether any effective values have changed. As the effective value 1004 for "Use Web Services" has changed from "Allowed" (at step 622) to "Denied" (at step 706), the program continues to step 710. In this case the presence of an InfoTip 1006 for "External Query Access" must be updated. This InfoTip 1006 now indicates that the user cannot be granted the "External Query Access" permission as this permission depends on the user also being granted the "Use Web Services" permission. While the InfoTip 1006 is shown in FIG. 10, it is understood that the content of the Infotip is only shown if the administrator chooses to open it.

At step 712, the editability 1008 of the "External Query Access" setting value is updated and it is made non-editable as the user has not been granted the "Use Web Services" permission.

At step 704, the setting value 1002 of the "External Query Access" permission is changed from "Allow" to a "Blank" value.

At decision block 702, there is a check to see whether any setting values (other than "Use web services") has changed. Since the setting value 1002 of "External Query Access" was changed from "Allow" to "Blank" at step 704, the program proceeds once again to step 706.

In this second pass through step 706, the effective value 1010 of "External Query Access" is changed from "Allowed" to "Denied", as the user no longer has a setting or inherited "Allow" for that permission.

At decision block 708, there is a check to see whether any effective values have changed. As the effective value of "External Query Access" did change from "Allowed" to "Denied", the program continues to step 710. No Infotips need to be changed as a result of the effective value of the "External Query Access" permission changing to "Denied".

At step 712, the editability of all controls remains the same as no control depends on the effective value of the "External Query Access" permission. At step 704, no other setting values change as no controls are dependent on the effective value of the "External Query Access" permission. At decision block 702, there is a check to see whether any setting values changed in step 704. Since the setting value of "External Query Access" was already blank, it did not change. The program returns to step 614. In the second round, no changes are made at steps 710, 712 or 704—therefore the second round of these steps is not shown in FIG. 10.

Figure 11:
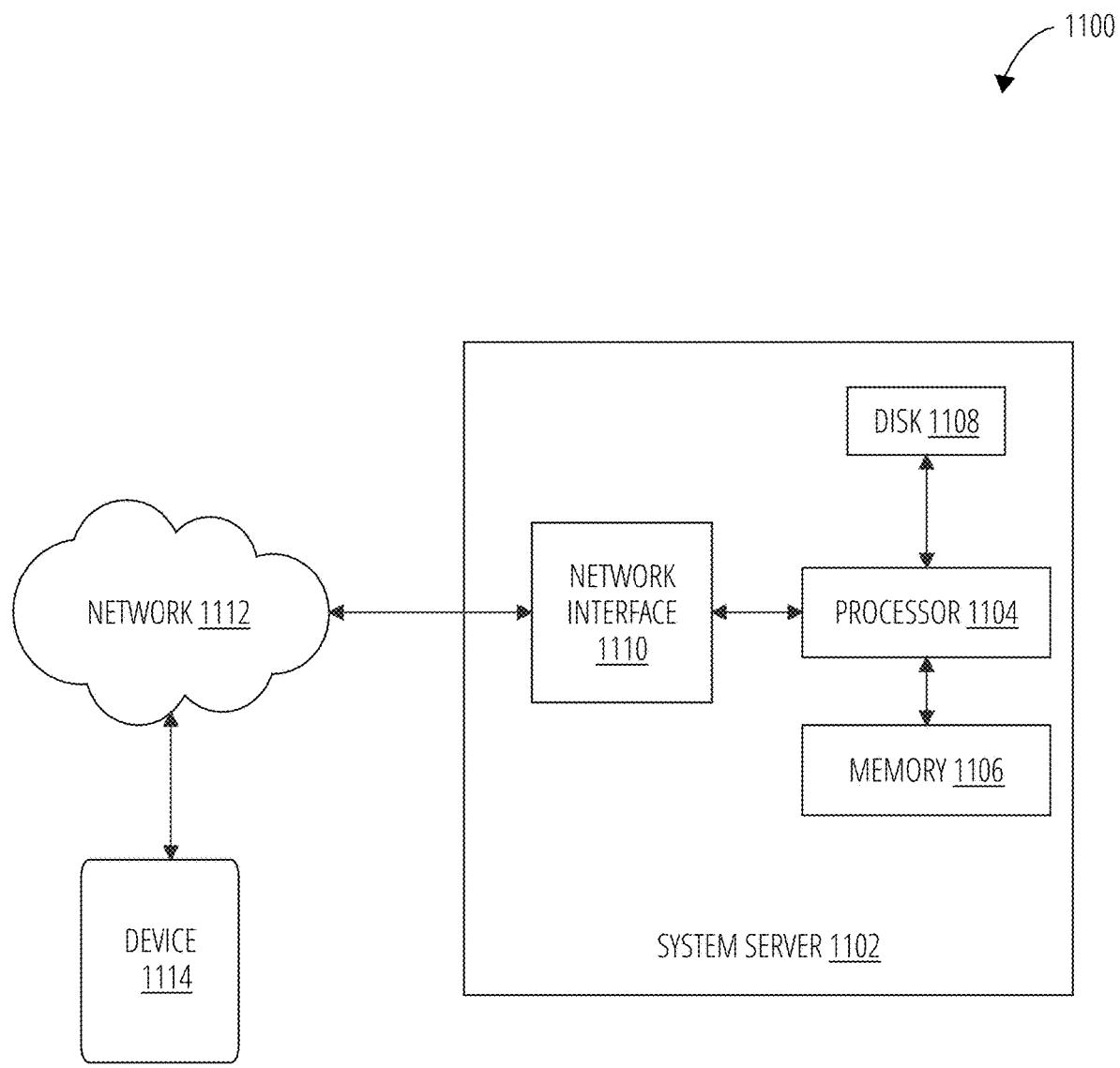
FIG. 11 illustrates a system in accordance with one embodiment.

FIG. 11 illustrates a system 1100 in accordance with one embodiment of machine learning segmentation.

System 1100 comprises a system server 1102 and a device 1114. System server 1102 can include a memory 1106, a disk 1108, a processor 1104 and a network interface 1110. While one processor 1104 is shown, the system server 1102 can comprise one or more processors. In some embodiments, memory 1106 can be volatile memory, compared with disk 1108 which can be non-volatile memory. In some embodiments, system server 1102 can communicate with device 1114 and via network 1112.

System 1100 can also include additional features and/or functionality. For example, system 1100 can also include additional storage (removable and/or non-removable) including, but not limited to, magnetic or optical disks or tape. Such additional storage is illustrated in FIG. 11 by memory 1106 and disk 1108. Storage media can include volatile and nonvolatile, removable, and non-removable media implemented in any method or technology for storage of information such as computer-readable instructions, data structures, program modules or other data. Memory 1106 and disk 1108 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1100. Any such non-transitory computer-readable storage media can be part of system 1100.

Communication between system server 1102 and device 1114 via network 1112 can be over various network types. In some embodiments, the processor 1104 may be disposed in communication with network 1112 via a network interface 1110. The network interface 1110 may communicate with the network 1112. The network interface 1110 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 1100 may take place over hard-wired, cellular, Wi-Fi or Bluetooth networked components or the like. In some embodiments, one or more electronic devices of system 1100 may include cloud-based features, such as cloud-based memory storage.

Using the network interface 1110 and the network 1112, the system server 1102 may communicate with device 1114. These device 1114 may include, without limitation, personal computer(s), server(s), various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like.

In some embodiments, system server 1102 also comprise a web server, and can format resources into a format suitable to be displayed on a web browser.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for managing a set of permissions on a user interface, the method comprising:
    retrieving, by a client, from a server, a setting value and an inherited value for a user for each permission in the set of permissions, the setting value being interchangeable between blank, allow and deny, with the setting value set as blank by default, the inherited value being interchangeable between blank, allow and deny and the inherited value for a given permis sion resulting from combining all of a plurality of setting values from all of a plurality of groups that the user is a member of such that a deny value supersedes an allow value, and the allow value supersedes a blank value, an inherited value of blank indicating no group membership;
    generating, by the client, an effective value for each permission by combining the setting value and the inherited value, with the effective value set as deny by default;
    initializing, by the client, a setting control and an effective control for each permission, with data from the server;
    offering, by the client, an information link for each effective value that has a conflict with a corresponding setting value;
determining, by the client and with the data from the server, whether one or more setting values should be uneditable;
    displaying, by the client, the user interface on a device to an administrator;
    changing, by the administrator, a selected setting value via the user interface;
    updating, by the client: one or more effective values changed by changing the selected setting value; one or more information links changed by changing the selected setting value;
one or more accessibilities editabilities changed by changing the selected setting value; and one or more setting values changed by changing the selected setting value, to generate one or more updated effective values and one or more updated setting values; and
    transmitting, by the client, to the server, the one or more updated setting values and the one or more updated effective values,
    wherein updating comprises:
    a) updating, by the client, an effective value that is dependent on a change made to the selected setting value;
    when the updated effective value changes:
    b) updating, by the client, an information link associated with the changed effective value;
    c) determining, by the client, whether a setting value that depends on the change made to the selected setting value should be uneditable;
    d) updating, by the client, a setting value that depends on the change made to the selected setting value; and
    repeating steps (a)-(d) when the setting value that depends on the change made to the selected setting value changes.

2. The computer-implemented method of claim 1, wherein in initializing the setting control and the effective control, the data comprises a set of one or more permission links.

3. The computer-implemented method of claim 2, wherein a permission link between a first permission and a second permission is a required link in which allowance for the first permission requires an allowance for the second permission.

4. The computer-implemented method of claim 2, wherein a permission link between a first permission and a second permission is an included link in which an effective value for the first permission is included with an allowance for the second permission.

5. The computer-implemented method of claim 4, further comprising:
    setting, by the client, an accessibility of a setting control of the first permission as inaccessible.

6. A computing apparatus for managing a set of permissions on a user interface, the apparatus comprising:
    a processor; and
    a memory storing instructions that, when executed by the processor,
    configure the system to:
    retrieve, by a client, from a server, a setting value and an inherited value for a user for each permission in the set of permissions, the setting value being interchangeable between blank, allow and deny, with the setting value set as blank by default, the inherited valu e being interchangeable between blank, allow and deny and the inherited value for a given permission resulting from combining all of a plurality of setting values from all of a plurality of groups that the user is a member of such that a deny value supersedes an allow value, and the allow value supersedes a blank value, an inherited value of blank indicating no group membership;
    generate, by the client, an effective value for each permission by combining the setting value and the inherited value, with the effective value set as deny by default;
    initialize, by the client, a setting control and an effective control for each permission, with data from the server;
    offer, by the client, an information link for each effective value that has a conflict with a corresponding setting value;

determine, by the client and with the data from the server, whether one or more setting values should be uneditable;

display, by the client, the user interface on a device to an administrator;

change, by the administrator, a selected setting value via the user interface;

update, by the client, one or more effective values changed by changing the selected setting value; one or more information links changed by changing the selected setting value; one or more editabilities changed by changing the selected setting value; and one or more setting values changed by changing the selected setting value, to generate one or more updated effective values and one or more updated setting values;

and transmit, by the client, to the server, the one or more updated setting values and the one or more updated effective values, wherein when changing the selected value, the instructions further configure the apparatus to:

a) update, by the client, an effective value that is dependent on a change made to the selected setting value;

when the updated effective value changes:

b) update, by the client, an information link associated with the effective value that has changed;

c) determine, by the client, whether a setting value that depends on the change made to the selected setting value should be uneditable;

d) update, by the client, a setting value that depends on the change made to the selected setting value;

and repeat steps (a)-(d) when the setting value that depends on the change made to the selected setting value changes.

7. The computing apparatus of claim 6, wherein when initializing, the instructions further configure the apparatus to:

initialize, by the client, the setting control and the effective control for each permission from data that comprises a set of one or more permission links.

8. The computing apparatus of claim 7, wherein a permission link between a first permission and a second permission is a required link in which allowance for the first permission requires an allowance for the second permission.

9. The computing apparatus of claim 7, wherein a permission link between a first permission and a second permission is an included link in which an effective value for the first permission is included with an allowance for the second permission.

10. The computing apparatus of claim 9, wherein the instructions further configure the apparatus to:

set, by the client, an accessibility of a setting control of the first permission as inaccessible.

11. A non-transitory computer-readable storage medium for managing a set of permissions on a user interface, the computer-readable storage medium including instructions that when executed by a computer, cause the computer to:

retrieve, by a client, from a server, a setting value and an inherited value for a user for each permission in the set of permissions, the setting value being interchangeable between blank, allow and deny, with the setting value set as blank by default, the inherited value being interchangeable between blank, allow and deny and the inherited value for a given permission resulting from combining all of a plurality of setting values from all of a plurality of groups that the user is a member of such that a deny value supersedes an allow value, and the allow value supersedes a blank value, an inherited value of blank indicating no group membership;

generate, by the client, an effective value for each permission by combining the setting value and the inherited value, with the effective value set as deny by default;

initialize, by the client, a setting control and an effective control for each permission, with data from the server;

offer, by the client, an information link for each effective value that has a conflict with a corresponding setting value;

determine, by the client and with the data from the server, whether one or more setting values should be uneditable;

display, by the client, the user interface on a device to an administrator;

change, by the administrator, a selected setting value via the user interface;

update, by the client, one or more effective values changed by changing the selected setting value; one or more information links changed by changing the selected setting value; one or more editabilities changed by changing the selected setting value; and one or more setting values changed by changing the selected setting value, to generate one or more updated effective values and one or more updated setting values; and transmit, by the client, to the server, the one or more updated setting values and the one or more updated effective values, wherein when changing the selected value, the instructions further configure the computer to:

a) update, by the client, an effective value that is dependent on a change made to the selected setting value;

when the updated effective value changes:

b) update, by the client, an information link associated with the changed effective value;

c) determine, by the client, whether a setting value that depends on the change made to the selected setting value should be uneditable;

d) update, by the client, a setting value that depends on the change made to the selected setting value;

and repeat steps (a)-(d) when the setting value that depends on the change made to the selected setting value changes.

12. The non-transitory computer-readable storage medium of claim 11, wherein when initializing, the instructions further configure the computer to:

initialize, by the client, the setting control and the effective control for each permission from data that comprises a set of one or more permission links.

13. The non-transitory computer-readable storage medium of claim 12, wherein a permission link between a first permission and a second permission is a required link in which allowance for the first permission requires an allowance for the second permission.

14. The non-transitory computer-readable storage medium of claim 12, wherein a permission link between a first permission and a second permission is an included link in which an effective value for the first permission is included with an allowance for the second permission.

15. The non-transitory computer-readable storage medium of claim 14, wherein the instructions further configure the computer to:

set, by the client, an accessibility of a setting control of the first permission as inaccessible.

16. The computer-implemented method of claim 1, further comprising displaying, by the client, a column of the setting value for each permission, and a column of the effective value of each permission, on the user interface.

17. The computing apparatus of claim 6, wherein the instructions further configure the apparatus to:
   display, by the client, a column of the setting value for each permission, and a column of the effective value of each permission, on the user interface.

18. The non-transitory computer-readable storage medium of claim 11, wherein when initializing, the instructions further configure the computer to:
   display, by the client, a column of the setting value for each permission, and a column of the effective value of each permission, on the user interface.

* * * * *